United States Patent
Baele

(10) Patent No.: US 12,154,277 B2
(45) Date of Patent: Nov. 26, 2024

(54) METHOD FOR SEGMENTING AN IMAGE

(71) Applicant: MINTT, Brussels (BE)

(72) Inventor: Xavier Baele, Brussels (BE)

(73) Assignee: MINTT, Brussels (BE)

( * ) Notice: Subject to any disclaimer, the term of this patent is extended or adjusted under 35 U.S.C. 154(b) by 731 days.

(21) Appl. No.: 17/417,910

(22) PCT Filed: Dec. 23, 2019

(86) PCT No.: PCT/EP2019/086962
§ 371 (c)(1),
(2) Date: Jun. 24, 2021

(87) PCT Pub. No.: WO2020/136180
PCT Pub. Date: Jul. 2, 2020

(65) Prior Publication Data
US 2022/0076426 A1    Mar. 10, 2022

(30) Foreign Application Priority Data

Dec. 27, 2018  (BE) .................................. 2018/5955

(51) Int. Cl.
| | |
|---|---|
| *G06T 7/187* | (2017.01) |
| *G01S 17/894* | (2020.01) |
| *G06T 5/70* | (2024.01) |
| *G06T 7/11* | (2017.01) |

(52) U.S. Cl.
CPC ............ *G06T 7/187* (2017.01); *G01S 17/894* (2020.01); *G06T 5/70* (2024.01); *G06T 7/11* (2017.01); *G06T 2200/04* (2013.01); *G06T 2207/20152* (2013.01)

(58) Field of Classification Search
CPC ... G06T 7/187; G06T 5/70; G06T 7/11; G06T 2200/04; G06T 2207/20152; G06T 2207/30181; G01S 17/894
See application file for complete search history.

(56) References Cited

U.S. PATENT DOCUMENTS

2018/0182094 A1* 6/2018 Parra ......................... G06T 7/20

OTHER PUBLICATIONS

Bard Romstad et al. "Mean-curvature watersheds: A simple method for segmentation of a digital elevation model into terrain units" Geomorphology, Elsevier, Amsterdam, NL, pp. 293-302, vol. 139, Oct. 29, 2011.
Y. Weiss. "Segmentation using eigenvectors: a unifying view" Computer Vision, 1999. The Proceedings of the Seventh IEEE International Conference on Kerkyra, Greece Sep. 20-27, 1999, US, Jan. 1, 1999 (Jan. 1, 1999), p. 975.
Meyer et al. "Topographic distance and watershed lines" Signal Processing, Elsevier Science Publishers B. V. Amsterdam, NL, pp. 113-125, vol. 38, No. 1, Jul. 1, 1994 (Jul. 1, 1994).

(Continued)

*Primary Examiner* — Molly Wilburn
(74) *Attorney, Agent, or Firm* — FISHERBROYLES, LLP; Roger L. Browdy; James E. Mrose

(57) ABSTRACT

The invention relates to a computer-implemented segmentation method of an image comprising a segmentation by watershed applied to an evaluation of a curvature at pixels of the image.

16 Claims, 1 Drawing Sheet

(56) References Cited

OTHER PUBLICATIONS

Hieu Tat Nguyen et al. "Watersnakes: Energy-driven watershed segmentation" IEEE Transactions on Pattern Analysis and Machine Intelligence, IEEE Computer Society, USA, pp. 330-342, vol. 25, No. 3, Mar. 1, 2003 (Mar. 1, 2003).
Ariel Shamir. "A survey on Mesh Segmentation Techniques" Computer Graphics Forum, pp. 1539-1556, vol. 27, No. 6, Jan. 4, 2008 (Jan. 4, 2008).
Kaveti S et al. "Second-order implicit polynomials for segmentation of range images" Pattern Recognition, Elsevier, GB, pp. 937-949, vol. 29, No. 6, Jun. 1, 1996 (Jun. 1, 1996).

\* cited by examiner

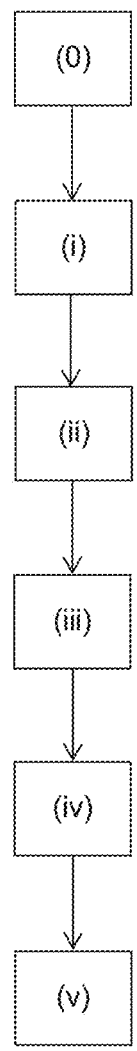

METHOD FOR SEGMENTING AN IMAGE

TECHNICAL FIELD

The present invention relates to a segmentation method of an image.

PRIOR ART

An image typically consists of a large number of pixels. During certain processing and/or information extraction operations of an image, it may be useful to partition the image into one or more groups of pixels that are easier to work with. To do this, image segmentation techniques are used.

These techniques typically allow to separate an area of an object in an image from a background area for a subsequent purpose comprising, for example, a detection, an extraction, a description, a tracking or a recognition of that object.

There are many image segmentation techniques that are more or less adapted to the targeted subsequent objective and to the type of image. However, these techniques have some defects in terms of effectiveness. A recurrent defect is the image over-segmentation limiting the efficiency of the segmentation and generating a waste of time in a further processing of the over-segmented image.

SUMMARY OF THE INVENTION

An object of the present invention is to provide a segmentation method of an image that is more efficient than known image segmentation techniques.

To this end, the invention provides a segmentation method of an image, computer-implemented and comprising the following steps:
  (0) selecting pixels of the image;
  (i) evaluating a curvature at each of the pixels, a domain of values of the curvature being discretized into a finite number of values, and said curvature being evaluated in said discretized domain;
  (ii) defining a topographic relief on the basis of the image, an altitude of said each pixel corresponding to the curvature evaluated in step (i);
  (iii) calculating a watershed of said topographic relief defined in step (ii) to delimitate catchment basins;
  (iv) defining a partition of the pixels based on the watershed calculated in step (iii):
  (v) defining a segmentation of the image into one or more groups of pixels based on the partition defined in step (iv).

The method according to the invention allows to segment an image in a particularly efficient way.

Indeed, this method allows to obtain a segmentation of the image which is geometrically natural, in the sense that the geometry of an object and/or a scene which is represented on this image is taken into account. This is because the curvature evaluated in step (i) at least partially encodes this geometry, for example, in a two-dimensional spatial data of each pixel and/or a gray level of each pixel, and/or a depth measurement of each pixel for a 3D image. The topographic relief that is defined in step (ii) highlights as a relief the pixels having a higher curvature. The watershed calculated in step (iii) may be calculated according to any technique known to a person skilled in the art, for example, preferably, a watershed segmentation method. This watershed allows to update edges of object areas and/or objects in the scene because they have different and higher curvatures than, for example, a background wall with a zero curvature. The edges thus appear in a perfectly natural way according to the continuity of the curvature, and the watershed marks precisely the places of maximum curvature (and thus the discontinuities). Finally, this watershed allows, in step (iv), to partition the pixels into different groups being separated by the watershed, these groups corresponding to object areas of the scene.

The great efficiency of the method according to the invention lies in the fact that it advantageously takes into account the curvature of the pixels and that it does not rely on groupings of (potentially arbitrarily) close pixels, such groupings generally being sources of an over-segmentation, i.e. a segmentation into a too large number of groups of pixels, or a faulty segmentation comprising, for example, a group of pixels which are not connected to each other within the group.

The terms "a domain of values of the curvature being discretized into a finite number of values, and said curvature being evaluated in said discretized domain" in said step (i) are completely equivalent to considering (more concisely, and according to the usual terminology of the person skilled in the art) that "the curvature is discretized into a finite number of values". In particular, step (i) allows to provide a geometrically natural and particularly efficient segmentation method as it is intended to take into account the evaluated curvature in a discretized form. Indeed, such a discretized form allows to strongly reduce the spectrum of possible values for the curvature, so that two neighboring pixels which would be of almost identical real curvatures will have a curvature evaluated in identical discretized form. This advantageously allows to avoid defining a topographic relief in step (ii) which would reflect inaccuracies and/or a noise in the image in the form of a large number of small topographic variations, these being likely to cause an over-segmentation. In this way, the segmentation that will be obtained in step (v) will be of a better quality and the method will be relatively more efficient. Preferably, the finite number of values into which the curvature is discretized is between 100 and 1600 values, more preferably between 150 and 1200 values, even more preferably between 200 and 800 values. It is preferably much smaller than the number of selected pixels.

Preferably, the image is a 3D image. Advantageously, the 3D image is an image captured by a 3D camera (or 3D imaging system), so that each pixel comprises a depth data, which allows a geometrically natural definition of the curvature. In particular, in this case, the 3D image is preferably not made up of voxels (of dimension 3), but of pixels (of dimension 2.5).

The method according to the invention is particularly useful for analyzing a scene captured by a 3D camera. The analysis of the scene is then preferably used for various purposes, for example, in a medical context or, for example, to detect a fall of a person who would be filmed in a punctual or continuous way by a 3D camera.

The method according to the present invention is suitable for any type of 3D image. Preferably, the 3D image is an image generated from a time-of-flight camera. Such a 3D camera is known to a person skilled in the art. In such a 3D camera, the perception of the depth is obtained from the shape of a light wave-front reflected from objects within the range of the 3D camera. Advantageously, the time-of-flight cameras allow an acquisition of a plurality of 3D images in a very short time, without the need for a complete scan of an object and/or a scene.

More precisely, in this case, the method according to the invention consists of a segmentation method of a 3D image generated by a time-of-flight camera.

Nevertheless, the method according to the present invention is by no means limited to the 3D images generated from a time-of-flight camera. Images captured by imaging systems such as a structured light camera, a stereo camera, a LIDAR, a radar, or a sonar, would not fall outside the scope of the invention. More generally, the method according to the invention can be used to segment images of any other nature known to a person skilled in the art.

In the context of this document, the notion of "pixel" is assumed to be known to a person skilled in the art. In simple terms, a pixel is a picture element. A pixel in a 3D image comprises a depth measurement, so that it can be represented in a three-dimensional space and interpreted as noisy measurement (or random variable) with values in that three-dimensional space, thereby associating the image with a cloud of points.

In the context of this document, the "curvature" refers to a quantitative measure of a more or less curved character. It is known to evaluate a curvature, for example, the Gauss curvature, at a point of a Riemannian manifold. In the context of the present invention, this notion of curvature evaluated at a pixel corresponds preferentially to a curvature at a point of a manifold interpolating at least locally a cloud of points associated with the pixels. There are several methods of calculating such a curvature providing curvatures associated with one of several curvature definitions. The segmentation of the image is likely to vary according to a choice of such a curvature calculation method. However, the present invention as such is not limiting to this choice, as it is mainly based on a definition of the topographic relief from a (discretized) curvature evaluation at the pixels of the image. Regardless of the curvature calculation method and the discretization chosen, the curvature evaluated in step (i) effectively captures the underlying geometry of the image. In particular, the effectiveness of the method according to the invention from the point of view of obtaining a segmentation of the geometrically natural image does not depend on a preferred implementation of step (i). It is claimed and discussed below that such a preferred implementation for which the evaluation of the curvature of step (i) is based on a principal component analysis, this being preferably applied (at least locally) to a collection of pixels interpreted as noisy measurements (or random variables).

In the context of this document, the term "discretization" (and its derivatives, e.g., "discretize") should be understood as a transformation of a continuous data (i.e., one that can take any value in a continuous space of values, typically a real interval) into a discrete data (i.e., one that can take any value in a discrete space of values), or, similarly, a transformation of a continuous domain into a discrete (and preferably finite) domain. Such a discretization can, for example, be done by projecting each such continuous data onto the nearest discrete value (preferably relative to the usual Euclidean distance on a real line of values), or, in other words, by choosing the discrete value that best approximates the continuous data. As a very basic example, if the interval [0, 10] is discretized into 11 natural values 0, 1, 2, 3, 4, 5, 6, 7, 8, 9 and 10, a continuous data of this interval could be projected on this discrete set by conventional rounding. For example, an evaluation of 5.23864 in the continuous space [0, 10] would become 5 in the discrete space obtained by this discretization. Thus, two values evaluated in the continuous space as being close to 5 become exactly 5 in discrete space. This applies to step (i) so that the curvature is preferably evaluated in a continuous space of values and then evaluated in discretized form in a discrete space of values obtained by discretizing the continuous space.

More particularly, preferably, step (i) comprises:
 a first sub-step of evaluating said curvature in a real bounded interval consisting of said domain; and
 a second sub-step of discretizing said interval into a finite number of values.

Preferably, it also comprises a third sub-step of (re-)evaluating the curvature in discretized form, i.e., in said discretized interval.

In particular, step (i) comprises, on the one hand, the evaluation of the curvature at each of the pixels as a certain real number belonging to a real bounded interval (constituting a continuous space corresponding to said domain), and on the other hand, the discretization of this interval into a finite number of values, such that this discretization applies to each such curvature value. The preferred interval is a closed bounded interval corresponding to $[0,r]$ where $r>0$. The person skilled in the art knows that $[0, r]:=\{x \in \mathbb{R} : 0 \leq x \leq r\}$. It is particularly advantageous to consider the curvature as taking its value in such an interval because such a real closed bounded interval can easily and efficiently be discretized into a finite number of values (for example, by choosing this same finite number of successively equidistant points on the interval). This is not the case for a classical regular curvature of Riemannian geometry which takes its values in a continuum of points of the real line. Indeed, it is not obvious to choose a finite number of values that account for such an unbounded continuous space in an evaluation of the Riemannian curvature. Preferably, the interval is $[0, \frac{1}{3}]$. The value $r=\frac{1}{3}$ is not very important because it can be changed by multiplying the curvature by a factor. In the following, a preferred implementation of step (i) is given which is perfectly adapted to the context of the invention and allows to evaluate the curvature in $[0, \frac{1}{3}]$. Note that this interval can advantageously be easily discretized into n values (for $n>1$ any natural number preferably between 100 and 1600, more preferably between 150 and 1200, even more preferably between 200 and 800). For example, consider the discrete space consisting of the values $(m/3)(n-1)^{-1}$ where m varies in the natural numbers between 0 and $n-1$.

In the context of this document, the term "topographic relief" preferably refers to a measure of altitude variation of a surface. The meaning of this term corresponds preferentially to the one it has in the field of geomorphology. The topographic relief defined in step (ii) corresponds to an association of an altitude at pixels of the image.

In the context of this document, the notion of "watershed" is preferably given a meaning equivalent to that of the field of geomorphology. It is therefore a boundary dividing the topographic relief into one or more regions, geographically called the "catchment basins". For such adjacent regions separated by the watershed, a water, for example, a rainwater, flows in different directions in only one of these regions, depending on whether it flows from a point in the first or the second region. This notion of watershed is classically defined on a continuous topographic relief. In the context of the invention, since the topographic relief is defined on a pixel basis, it is mainly discrete. There are several definitions of a watershed concept in this context. The invention as such is not limited in any way by a choice of watershed calculation method. Indeed, the invention is based at least on the characteristic of performing this watershed calculation on the basis of a topographic relief obtained from the curvature at pixels of the image and not on this choice of specific calculation method. In particular, the advantageous character of the method according to the invention from the point of view of obtaining a segmentation of the geometrically natural image does not depend on a preferred implementation of step (iii). Furthermore, as discussed later in this summary of the invention, there are several methods of calculating the watershed, with steps (ii) to (v) preferably implemented via a known watershed segmentation method.

In the context of this document, the term "partition" of a set is a division of the set into subsets, so that each element of the set belongs to one and only one subset. Typically, a segmentation of an image is a partition of pixels constituting the image into one or more groups of pixels, so as to facilitate further processing and/or analysis of the image on the basis of these groups and no longer on the basis of each pixel. In order to facilitate this processing and/or this analysis, it is important that the segmentation of the image is done efficiently.

Advantageously, the method according to the present invention allows to define an efficient image segmentation in step (v) based on the partition defined in step (iv) on the pixels selected for step (0), so that each group of pixels of the segmentation comprises one and only one subset of this partition. The group or the groups of pixels of the segmentation are exclusively separated by the watershed calculated in step (iii).

Preferably, the image consists of a set of pixels and the pixels that are selected in step (0) consist of all the pixels in that set. This allows to obtain a more precise topographic relief based on all the pixels of the image, and thus to calculate more precisely its watershed, and thus to define a more precise segmentation of the image. The invention is not limited to this embodiment, and the set of the pixels selected in step (0) may not comprise all the pixels of the set of pixels that constitute the image. In particular, the pixels selected in step (0) preferably comprise at least 50%, more preferably at least 90%, of the pixels of the image. Advantageously, in this case, steps ($i$) to (iii) of the method are performed faster than when all the pixels of the image are selected from step (0).

A preferred implementation of step (i) for evaluating a curvature at each of the pixels is now introduced.

According to a preferred embodiment of the invention, for a 3D image, step (i) comprises the following sub-steps:
(i.1) defining a collection of neighboring pixels for each pixel at which the curvature is to be evaluated;
(i.2) calculating a covariance matrix of the neighboring pixels;
(i.3) calculating eigenvalues of the covariance matrix calculated in step (i.2);
(i.4) evaluating said curvature based on the eigenvalues calculated in step (i.3).
These sub-steps are more preferably contained in the above mentioned first sub-step of step (i).

This preferred embodiment of step (i) allows for quick and easy calculation of the curvature at each pixel. Full account is taken of the fact that the pixels form a discrete structure on the basis of which local curvature calculations should be used. For this purpose, the curvature at a pixel is evaluated with respect to several neighboring pixels surrounding the pixel in question, which reflect the local geometry in the vicinity of the pixel. These neighboring pixels preferably comprise the pixel at which the curvature is to be evaluated. They are interpreted, as explained earlier in this text, as noisy measurements (or random variables) with values in a three-dimensional space in order to calculate the covariance matrix. Thus, for neighboring pixels of a pixel whose curvature is to be evaluated, being noted $P_1, P_2, P_3, \ldots, P_N$, with $N \in \mathbb{N} \setminus \{0\}$, if the pixel $P_j$, for $1 \leq j \leq N$, is associated in the three-dimensional space with the triplet $$P_j = (P_{ij})_{1 \leq i \leq 3} := \begin{pmatrix} P_{1j} \\ P_{2j} \\ P_{3j} \end{pmatrix},$$

and if the center of gravity of these pixels corresponds to the triplet $$(\overline{P_{i*}})_{1 \leq i \leq 3} := \begin{pmatrix} \overline{P_{1*}} \\ \overline{P_{2*}} \\ \overline{P_{3*}} \end{pmatrix},$$

then the covariance matrix of the neighboring pixels corresponds to $$\frac{1}{N}\left[(P_{ij} - \overline{P_{i*}})_{\substack{1 \leq i \leq 3 \\ 1 \leq j \leq N}}\right]\left[(P_{ij} - \overline{P_{i*}})_{\substack{1 \leq i \leq 3 \\ 1 \leq j \leq N}}\right]^t.$$

This preferred expression of the covariance matrix uses conventional matrix notations known to a person skilled in the art. In particular, the exponent t corresponds to the transpose of a matrix.

This covariance matrix being symmetric of size (3,3), the problem of its diagonalization, as well as the calculation of its eigenvalues and eigenvectors can be addressed. In the aforesaid preferred context, if $\lambda_1 \leq \lambda_2 \leq \lambda_3$ designates the eigenvalues calculated in step (i.3) ordered in increasing order, the curvature (evaluated in the sub-step (i.4)) preferably coincides with a value $$\frac{\lambda_1}{\lambda_1 + \lambda_2 + \lambda_3}.$$

This number is interpreted as a curvature of a manifold interpolating the neighboring pixels. Thus, advantageously, this preferred embodiment of step (i) provides a simple and explicit expression for the curvature at a pixel. The latter takes its values in the real closed bounded interval $[0, \frac{1}{3}]$. This interval is then preferably discretized into a finite number of values (e.g., according to one of the previously given examples) (and preferably in the aforementioned second sub-step of step (i)) and this discretization is applied to the evaluated curvature (e.g., according to a rounding and/or a projection onto a discrete value closest to the discretized interval, as previously discussed). The rational values mentioned for the curvature could nevertheless optionally be used directly as discrete values.

Specifically, steps (i.2) and (i.3) are preferably implemented by a principal component analysis on the neighboring pixels. Such an analysis allows, via the calculations explained above, to define main dispersion axes of the neighboring pixels associated with the eigenvectors of the covariance matrix. Advantageously, and preferably, a normal vector to an interpolation manifold of the neighboring pixels can then be obtained from these eigenvectors, so that an orientation of the pixel at which the curvature is evaluated can be determined. Briefly, step (i.3) preferably also comprises a calculation of the eigenvectors of the covariance matrix calculated in step (i.2), and step (i) comprises the following sub-step:

(i.5) determining an orientation of the pixel at which the curvature is evaluated in step (i.4) based on the eigenvectors calculated in step (i.3).

This orientation is useful for verifying the segmentation obtained by the method according to the invention, by comparing an orientation of a pixel with that of one or more of its neighboring pixels. In this way, a global orientation of the pixel groups of the partition of step (iv), and of the object areas represented by these pixel groups, can be highlighted. Furthermore, as mentioned later in this summary, the orientation can also be used in an additional segmentation process on the pixel groups of the segmentation of step (v). For this purpose, the orientation, and/or other parameters, associated with pixels on one edge of a group of pixels of the segmentation of step (v) are compared with the orientation, and/or other parameters, of the pixels on an adjacent edge of another group of pixels of the segmentation of step (v), so as to determine whether these two groups of pixels could possibly form part of a same plane or a same object area of the image.

Preferably, according to any one of the aforesaid preferred embodiments of step (i), the collection of neighboring pixels defined in step (i.1) comprises at most one hundred pixels comprising the pixel at which the curvature is to be evaluated. These at most one hundred pixels are preferably distributed in a geometric shape among: a square, a disc, an oval, a rectangle, a rhombus, a cross. However, another geometrical form would not be outside the scope of the invention. Even more preferably, the collection of neighboring pixels consists of at most eighty-one pixels essentially distributed in a square with a side of nine pixels, centred at the pixel at which the curvature is to be evaluated. The term "neighboring pixels" preferably refers to the nearest neighboring pixels. However, this term cannot exclude an optional choice of second and/or third and/or fourth nearest neighboring pixels.

Preferably, the collection of neighboring pixels comprises the pixel at which the curvature is to be evaluated, and consists of at most twenty-five pixels substantially distributed in a five pixel square centred at the pixel at which the curvature is to be evaluated.

More preferably, this collection consists of nine pixels substantially distributed in a square with a side of three pixel, centred at the pixel at which the curvature is to be evaluated. This configuration of nine neighboring pixels is advantageous because it allows to evaluate a curvature which takes into account a variation of pixels in each direction, while minimizing the number of neighboring pixels, which advantageously amounts to minimizing the complexity of the calculation of the curvature, and thus the time necessary to numerically evaluate this curvature. A preferred implementation of step (iii) for the calculation of the watershed is now discussed.

Preferably, the watershed in step (iii) is calculated based on algorithmic techniques similar to those used in a watershed segmentation method. Such a method is generally known to a person skilled in the art. On the basis of a topographic relief, a calculation of the watershed by virtual simulation of a flooding of the relief is proposed. This flooding can be simulated, for example, by a rise of water from the points of local minimum elevation of the relief, or by a global runoff of water, similar to a rainfall over the whole relief. Thus, according to these two performances of step (iii), step (iii) preferably comprises, the following sub-steps:

(iii.1) determining a subset of pixels for which the curvature evaluated in step (i) is locally minimal;
(iii.2) simulating a flooding of the topographic relief by a virtual rise of water from each of the pixels of the subset of pixels;
(iii.3) calculating the watershed based on the simulation of step (iii.2).

or the following sub-steps:

(iii.1') simulating a flooding of the topographic relief by a virtual water runoff from each of the pixels;
(iii.2') calculating the watershed based on the simulation of step (iii.1').

Advantageously, algorithmic methods for calculating the watershed as aforesaid are of a linear complexity in the number of pixels selected in step (0), which allows for very fast and efficient performance.

In practice, the image on which the method according to the invention is applied is likely to comprise inaccuracies and/or noise from different sources. In this way, surfaces that are represented on the image sometimes undergo small changes that can lead to an over-segmentation. Despite the efficiency of the method according to the invention, in particular on 3D images, it is advisable to limit as much as possible these inaccuracies and/or noises on the image. Therefore, the method preferably comprises one or more of the following technical features:

a step of pre-processing the image prior to step (0) and/or step (i), the pre-processing step preferably comprising a filtering to reduce a noise of said image; and/or
a post-processing step on groups of pixels of the segmentation defined in step (v).

The aforesaid post-processing step may comprise a step of any one of the segmentation processes known to a person skilled in the art. It is then used in sequence after the method according to the invention to ensure that the segmentation defined in step (v) is the most effective for performing a further processing and/or an analysis of the image. This post-processing preferably comprises a comparison of the groups of adjacent pixels in the image from the segmentation defined in step (v). The purpose of this comparison is to determine whether two such groups of adjacent pixels could be part of a same plane and/or a same object area of the image. A merging and/or a grouping of the two such groups is then preferentially performed if they can indeed be part of a same plane or a same object area of the image in view of said comparison. In this way, the method according to this particular embodiment of the invention allows to locate continuous planes and/or surfaces in a particularly efficient way.

Preferably, and as described earlier in this summary of the invention, this comparison is made on the basis of an orientation of the pixels at the edge of groups of pixels, the orientation having been calculated in step (i), preferably using principal component analysis techniques on the pixels.

The present invention also provides a computer system comprising means for carrying out the method according to any of the embodiments of the method according to the invention. The invention also provides a computer program comprising instructions which, when the computer program is executed, cause it to carry out the method according to any one embodiment of the invention. The invention also provides a computer-readable medium on which aforesaid computer program is stored.

The computer system preferably comprises at least one of the following hardware or computer equipment:
- at least one computer with a processor for running any algorithms, preferably of a PC-type architecture or of an embedded-type architecture (ARM);
- an integrated circuit of the ASIC type which is specific to an application and/or an algorithm;
- a logic integrated circuit of the FPGA type which is reconfigurable (or reprogrammable) after manufacture.

The computer-readable medium means any medium or set of media that is capable of storing digital information. It may comprise, for example, at least one of the following element: a digital memory, a server, a USB key, a computer. It can be in a cloud.

All the embodiments and all the advantages of the method according to the invention are transposed mutatis mutandis to the computer system according to the invention, the computer program according to the invention and the computer-readable medium according to the invention.

The present invention has been described above in connection with specific embodiments, which are illustrative and should not be considered limiting. In general, it will be apparent to a person skilled in the art that the present invention is not limited to the examples illustrated and/or described in the summary of the invention. The invention comprises each of the novel characteristics and all combinations thereof.

BRIEF DESCRIPTION OF FIGURES

The understanding of the summary of the invention can be completed by the attached FIG. 1. This represents a simplified flowchart of an image segmentation method according to the invention. The illustrated steps (0), (i), (ii), (iii), (iv) and (v) correspond to steps (0), (i), (ii), (iii), (iv) and (v) claimed and described in the summary of the invention. These steps are performed in this order.

DETAILED DESCRIPTION OF EMBODIMENTS OF THE INVENTION

In general, the drawings or FIGURES herein are schematic and not limiting. The presence of reference numbers and/or letters in the drawings is not limiting, even when these numbers and/or letters are indicated in the claims. The drawings in the figures are not to scale. In addition, similar elements are noted by similar references, and same or similar elements may have the same references in the FIGURES.

First, a simple example of the method according to the invention for a 3D image is presented, with most of the pixels of the image being preferably selected for step (0).

As an example, it is assumed that the 3D image is acquired frontally from a scene consisting of a sphere, for example, a balloon, being placed in front of a bare wall. In this case, in step (i), the curvature at a pixel associated with the wall will be essentially zero, while the curvature at a pixel associated with the sphere will be a strictly positive number clearly distinct from zero. In step (ii), the topographic relief that is defined is essentially flat, except at the positions that correspond to the pixels associated with the sphere. At these positions, a steep rise will be observed near the edges of the sphere, this rise being circular and enclosing a hollow corresponding to the pixels in the middle of the face of the sphere exposed frontally to the scene. The distinction between the pixels of the edge of the sphere on the image, and the pixels of the middle of the exposed face is made taking into account the depth measurement of the pixels of the 3D image, since the image is a 3D image. In step (iii), it is clear that the watershed is approximately a circle corresponding on the topographic relief to the aforesaid steep rise. In this way, in step (iv), the pixels are partitioned into two groups: those of the sphere surrounded by the watershed, and those of the wall. In this basic example, the sphere can be highlighted in front of the wall in an advantageous way.

It is now developed an example illustrating the high efficiency of the method according to the invention to segment a 3D image generated from a time-of-flight camera.

It is assumed as an example that the 3D image represents an angle on a real object and/or a real scene, e.g., a junction angle between two walls in a scene. For such an image captured by a time-of-flight camera, the angle becomes, on the acquired 3D image, a curve connecting the two walls, so that there is no more abrupt angular discontinuity following the junction between these walls. Therefore, the notion of curvature at a pixel associated to the junction between the two walls is well defined and associated to a finite number. Furthermore, another advantage of the method according to the invention in this context is that step (iii) allows an implementation of the segmentation of the 3D image from the faces of the wall, since these are of an essentially zero curvature. The watershed then calculated algorithmically, preferably by a virtual flooding of the topographic relief according to a watershed segmentation method step, will then allow to clearly distinguish each of the two walls, as well as their junction, as a neighborhood of the latter presents a larger but still well defined curvature, as explained above. In this context, a segmentation method that groups nearby pixels, for example, based on a predefined radius, would create a partition of the pixels associated with these two walls into a large number of groups, so that each of the two walls and their junction could not be clearly distinguished at the end of the segmentation of the 3D image. This is the reason why the method according to the invention is efficient, precise and fast, especially on images acquired by such a time-of-flight camera. These cameras are very well known and currently widely used on the market. It is therefore all the more advantageous that the method according to the invention is effective in this context.

In summary, the present invention relates to a segmentation method of a computer-implemented image comprising a watershed segmentation applied to an evaluation of a curvature at pixels of the image.

More specifically and/or more generally, the method according to the invention may be explained as a segmentation method of an image comprising pixels, the method being computer-implemented and comprising the following steps:
  (A) evaluating a curvature at each pixel:
  (B) applying a watershed segmentation algorithmic method to the evaluation of the curvature of step (A).

The segmentation method according to the claimed invention involves the discretization of the curvature evaluated in step (i) (and/or (A)). However, in an alternative embodiment of the invention, a segmentation method of a (3D) image according to the present invention is proposed in which step (i) is substituted for step "(i) evaluating a curvature at each of the pixels; this step comprising the sub-steps (i.1) to (i.4)" (the latter being described in the summary of the invention). Indeed, although the discretization of the curvature is not mentioned in this alternative embodiment, the many advantages of the calculation method of the curvature described in the summary of the present invention are sufficient to give this alternative embodiment its own invention status. In this case, step (i) (and/or (A)) is then implemented via a principal component analysis.

It should be noted that, in this document, the use of the verb "comprise" and its variants, synonyms and conjugations cannot in any way exclude the presence of elements other than those mentioned. Similarly, the use in this document of the indefinite article "a", "one", or the definite article "the", to introduce an element does not exclude the presence of a plurality of these elements.

In the context of this document, "computer" is preferably understood to mean any computing unit capable of carrying out the method according to the invention. Such a computer may comprise, for example, a processor, and/or a computer network, and/or a programmable unit, and/or a data processing system, and/or a server.

A "computer-readable medium" is preferably any medium or set of media that is capable of storing digital information. Such a medium may comprise, for example, a digital memory, and/or a server, and/or a USB stick, and/or a computer.

The invention claimed is:

1. Segmentation method of an image,
the method being computer-implemented and comprising the following steps:
(0) selecting pixels of said image;
(i) evaluating a curvature at each of said pixels,
a domain of values of the curvature being discretized into a finite number of values, and said curvature being evaluated in said discretized domain;
(ii) defining a topographic relief based on said image, an altitude of each of said pixels corresponding to said curvature evaluated in step (i);
(iii) calculating a watershed of said topographic relief defined in step (ii) to delimitate catchment basins;
(iv) defining a partition of said pixels based on said watershed calculated in step (iii);
(v) defining a segmentation of said image into one or more groups of pixels based on said partition defined in step (iv).

2. Segmentation method according to claim 1, wherein step (0) consists in selecting all the pixels of said image.

3. Segmentation method according to claim 1, wherein step (i) comprises:
a first sub-step of evaluating said curvature in a real bounded interval consisting of said domain; and
a second sub-step of discretizing said interval into a finite number of values.

4. Segmentation method according to claim 3, wherein said interval corresponds to a closed bounded interval corresponding to [0,r] where r>0.

5. Segmentation method according to claim 1, wherein said image is a 3D image.

6. Segmentation method according to claim 5, wherein said 3D image is generated from a time-of-flight camera.

7. Method according to claim 6, wherein step (i) comprises the following sub-steps:
(i.1) defining a collection of neighboring pixels for each pixel at which the curvature is to be evaluated;
(i.2) calculating a covariance matrix of said neighboring pixels;
(i.3) calculating eigenvalues of the covariance matrix calculated in step (i.2);
(i.4) evaluating said curvature based on the eigenvalues calculated in step (i.3).

8. Method according to claim 7, wherein said curvature coincides with a value $$\frac{\lambda_1}{\lambda_1 + \lambda_2 + \lambda_3},$$

$\lambda_1 \leq \lambda_2 \leq \lambda_3$ designating the eigenvalues calculated in step (i.3), ordered in increasing order.

9. Method according to claim 8, wherein said collection of neighboring pixels defined in step (i.1) comprises the pixel at which the curvature is to be evaluated, and consists of at most eighty-one pixels substantially distributed in a square with a side of nine pixels, centred on the pixel at which the curvature is to be evaluated.

10. Method according to claim 9, wherein said collection of neighboring pixels defined in step (i.1) consists of nine pixels substantially distributed in a square with a side of three pixels, centred at the pixel at which the curvature is to be evaluated.

11. Method according to claim 7, wherein the step (i.3) also comprises a calculation of the eigenvectors of the covariance matrix calculated in step (i.2), and
wherein step (i) comprises the following sub-step:
(i.5) determining an orientation of the pixel at which the curvature is evaluated in step (i.4) based on the eigenvectors calculated in step (i.3).

12. Method according to claim 1, wherein step (iii) comprises the following sub-steps:
(iii.1) determining a subset of said pixels for which the curvature evaluated in step (i) is locally minimal;
(iii.2) simulating a flooding of said topographic relief by a virtual rise of water from each of the pixels of said subset of said pixels;
(iii.3) calculating said watershed based on the simulation of step (iii.2).

13. Method according claim 1, wherein step (iii) comprises the following sub-steps:
(iii.1') simulating a flooding of said topographic relief by a virtual water runoff from each of said pixels;
(iii.2') calculating said watershed based on the simulation of step (iii.1').

14. Method according to claim 1, further comprising a step of pre-processing said image prior to step (0), the pre-processing step comprising a filtering to reduce a noise of said image.

15. Method according to claim 1, further comprising a post-processing step on groups of pixels of the segmentation defined in step (v).

16. A non-transitory computer-readable medium on which is stored a computer program comprising instructions which, when said computer program is executed, cause it to carry out the method according to claim 1.

* * * * *